United States Patent Office 2,800,449
Patented July 23, 1957

2,800,449

DRILLING FLUIDS FOR OIL WELLS AND ADDITIVES THEREFOR

William C. Browning, Schofield, Wis., assignor to Marathon Corporation, Rothschild, Wis., a corporation of Wisconsin No Drawing. Application March 17, 1954,
Serial No. 416,943

2 Claims. (Cl. 252—8.5)

This invention relates to drilling fluids for oil wells and additives therefor, and is a continuation-in-part of my copending application Serial No. 242,783, filed August 20, 1951, now abandoned.

In rotary drilling operations as customarily carried out in drilling oil or gas wells, a fluid is continuously circulated during drilling. The drilling fluid serves as a carrier for the cuttings, as a lubricant for the bit, and a source of hydrostatic pressure to prevent caving of the borehole or intrusion into the borehole of gases or liquids encountered in the formation being bored. Furthermore, the drilling fluid serves to seal the walls of the borehole and thereby reduces loss of fluid to the formations penetrated.

The most important properties of a drilling fluid which control its ability to perform the various functions described above are its density, viscosity and its filter or fluid loss. These properties are generally interdependent, and it is, therefore, necessary that a drilling fluid have these properties in proper balance and that this balance be maintained during drilling.

The viscosity of the drilling fluid in general should be sufficiently low so that the fluid is readily pumpable, and the drill can be rotated with a minimum of power. Excessive viscosity of the fluid can cause the drill to bind in the borehole requiring a suspension of drilling operations. The viscosity should be as low as possible, not exceeding 85 cps.

Gel formation, that is, the ability of a fluid to gel upon standing, is of importance in a drilling system wherein a thixotropic fluid is utilized. Initial gel and gel after 10 minutes are the two important values. Measured in grams (gms.) a suitable fluid should have initial gel values (0′) in the range of about 0 to 50, and 10 min. (10′) gel values of 0 to 200. There is a growing practice, however, to use drilling fluids having zero-zero gel values.

Low fluid loss is a desirable characteristic of a drilling fluid because a high fluid loss will deposit an exessively thick cake on the bore walls. This may cause an increase in viscosity of the fluid and ultimate sticking of the drill. Furthermore, a drilling fluid having low water loss prevents free water from penetrating into the formation and thus prevents the hydration of certain shales which otherwise might swell or slough off the walls of the borehole, causing sticking of the drill or a closure of the hole. Filter or fluid loss should preferably be as low as possible and generally not over 10 cc. after 30 minutes (30′).

Most of the conventional fluids depend on the presence of swelling clays, such as, bentonite, to provide the low water loss properties essential to their operation. These clays are hydrated by the water in the fluid with a resulting swelling and increase in viscosity. During the course of drilling with conventional aqueous fluids, shale and clay cuttings normally hydrate and become incorporated in the drilling fluid and thereby increase the viscosity and density of the drilling fluid. This is often referred to as "making mud." To offset the increase in the viscosity resulting from the hydration of these added clays or cuttings, it is the practice to add mud thinning chemicals to the fluid. Constant attention must therefore be paid to maintain the fluid properties in proper balance.

If a drilling fluid containing a substantial amount of hydrated and swelled clays is contaminated with salt, a thickening of the fluid occurs due to flocculation of these hydrated clays and they can only be thinned by dilution with water. Relatively expensive weighting agents may then have to be added to maintain the desired specific gravity of the thinned-out fluid.

Solid salt or brine solutions are often encountered in oil well drilling which present a serious drilling problem. High concentrations of brine increase the fluid loss of the conventional drilling fluids, in addition to the thickening effect referred to above, to the extent that many costly and time-consuming steps have to be taken when such a condition is encountered during drilling.

Salt contamination is at present the most difficult of all drilling fluid problems. The usual mud thinners are practically useless, and a mud that will "get by" is frequently the best obtainable with present methods of treatment. Either because of salt stringers, salt water flows, or off-shore drilling, this problem is widespread and serious. The Permian Basin of West Texas and New Mexico is one of the major oil producing areas of the United States, and currently one of the most active. Yet, no major area of oil production has more problems of contamination by salt anhydrite and gypsum than the Permian Basin. The main Permain salt section is generally several hundred feet thick. Salt stringers are almost always encountered. Anhydrite is also found in strata of varying thickness at many different depths. Gypsum is commonly found throughout the area. Fresh water for use in drilling is very scarce and alkali waters are commonly used.

Salt contamination is also common in other areas of Texas, in Oklahoma, and in Louisiana. Many wells have been lost because of salt contamination, and there are times when the most expensive treatment is preferable to possible loss through such causes as caving and stuckpipe. Therefore, any means of decreasing the difficulties incident to drilling through salt contamination is of considerable practical interest.

At present, the most common agent used to condition fluids for drilling through solid salt, or to stabilize fluids that have been heavily contaminated with salt flows, is starch of the prepasted or peptized variety. One disadvantage of using starch to control fluid loss is the increase in viscosity of the drilling fluid that occurs with increasing starch treatment. Addition of sufficient starch to achieve the desired fluid loss results frequently in obtaining undesirable high viscosities and gels. The use of starch has several other disadvantages among which are susceptibility to fermentation, increasing viscosity and gel values with increasing concentration, and relatively high cost.

My invention resides essentially in the use of a brine solution (an aqueous solution containing at least about 20% sodium chloride) with a lignosulfonate dissolved therein as a drilling fluid or a main component thereof. Most lignosulfonates are salted out when added to a brine solution, but I have discovered that lignosulfonates will remain soluble or active in brine solutions if sufficient alkali is also present to maintain a pH of at least 9 in the fluid system.

The deliberate use of a brine solution and a lignosulfonate as basic components in a drilling fluid has never been proposed before, in fact, it has been avoided and deemed undesirable for the reasons explained above. I have discovered that lignosulfonates will function as an effective surface active agent in a brine solution at pH 9 or above whereby I provide for the first time a base drilling fluid having novel and highly desirable properties. Such drilling fluid is unaffected by salt strata or salt water encountered in the formation. Furthermore, the brine-base drilling fluid combats heaving shale due to prevention of swelling of bentonitic clays in the presence of brine. My brine base fluid is also resistant to contaminant, such as, cement, anhydrite, calcium chloride, and has the desirable "low mud making" properties.

It has been previously proposed, as in the patent to Anderson No. 2,430,039, November 7, 1947, to add small amounts of sodium chloride brine to drilling fluids containing alkali metal soaps in order to prevent precipitation of calcium soaps. However, the concentration of the sodium chloride brine in the final mud drilling fluid as used is very dilute and of the order of 0.1% or less than 2% by volume of the other constituents. Obviously, such composition is not a brine based fluid and does not function or serve the purposes of the present invention.

I prefer to use sodium lignosulfonate compounds which may be derived from basic calcium lignosulfonate made in accordance with the procedure disclosed in Howard Reissue Patent No. 18,268 December 1, 1931. The basic calcium lignosulfonate is converted to the sodium salt by reaction with stoichiometric equivalent amounts of sodium salts, the anions of which will form water-insoluble calcium salt, such as, sodium phosphate, sodium fluoride, sodium oxalate and sodium carbonate. Other sources of lignosulfonates in somewhat cruder form can be obtained from waste sulfite liquor, or such liquor after having been subjected to alcohol fermentation or yeast propagation. The calcium lignosulfonates so obtained are converted to sodium salts as previously described.

In order to reduce the water loss of my drilling fluid base I may add solid inorganic materials in the range of 0.1 to 0.5 micron particle size, such as calcium carbonate, in amounts of about 1 to about 25% by weight of the lignosulfonate used. I may add these solids in the form of a previously prepared solid dispersion in the sodium lignosulfonate. Such solid dispersion may be made, for example, by adding the finely divided solid to the sodium lignosulfonate in suitable amounts, for example, 1 to 25% by weight of the sodium lignosulfonate. I may also incorporate with the sodium lignosulfonate an alkali, such as sodium hyroxide or sodium carbonate, in sufficient amount so as to yield a pH of not less than 9 when the drilling fluid is made up.

Drilling fluids may be prepared in accordance with my invention having simultaneously low water loss, low viscosities, low weight and O-O gels. Use of my drilling fluid obviates the hydration of heaving shales which otherwise might slough off the walls of the borehole causing sticking of the drill or closure of the bore.

In preparing a drilling fluid base in accordance with my invention an aqueous brine solution is first prepared having at least 20% by weight of sodium chloride. The sodium lignosulfonate is added in amounts of about 10 to 20 pounds per barrel (42 gallons) of brine, or in the range of about 1 to about 10% by weight of the base fluid. A suitable amount of caustic soda is added, if necessary, so as to adjust the pH of the solution to about 9. From about ½ pound to about 10 pounds per barrel of caustic soda may be required for this purpose.

The following is a specific drilling fluid prepared according to my invention using a saturated brine solution having 30% by weight sodium chloride.

| Composition | Lbs. per Bbl. of Brine |
| --- | --- |
| Sodium lignosulfonate | 14 |
| Calcium carbonate | 4 |
| Sodium hydroxide | 1 |

This drilling fluid suitable for "work-over" operations has the following properties:

| | |
| --- | --- |
| Viscosity | cps 6 |
| Initial gel | gms 0 |
| 10' gel | gms 0 |
| 30' fluid loss | cc 5.1 |
| Density | lbs./gal 9.85 |
| pH | 9.3 |

The properties of the fluids shown above and in the examples following were determined by the standard American Petroleum Institute methods described in a publication entitled Code 29 "Recommended Practice in Standard Field Procedure for Testing Drilling Fluids" (1942).

I may also add weighting materials, such as barytes, iron oxide, galena and the like, in suitable amounts to my drilling fluid in order to impart a desired specific gravity to same. When desired, the viscosity and gel properties of my fluid may be controlled by treating it with drilling clays, and especially desirable results are obtained with montmorillonite clays (ball clays) or clay minerals having a fibrillar structure, such as attapulgite, hectorite, etc. The following is a specific example of a drilling fluid made in accordance with my invention using a saturated brine solution having 30% by weight sodium chloride.

| Composition | Lbs. per Bbl. of Brine |
| --- | --- |
| Sodium lignosulfonate | 20 |
| Sodium hydroxide | 3 |
| Clay (native Texas shale) | 76 |

This drilling fluid has the following properties:

| | |
| --- | --- |
| Viscosity | cps 10.0 |
| Initial gel | gms 0 |
| 10' gel | gms 0 |
| 30' fluid loss | cc 2.8 |
| Density | lbs./gal 10.75 |
| pH | 11.25 |

Water-base or oil-in-water emulsions have recently become significant as oil well drilling fluids because of the following advantages: (a) they reduce fluid loss encountered with conventional muds because they form a thin coating, substantially impervious to fluid, on the walls of the bore hole, (b) they reduce torque on the drill stem, (c) they lubricate equipment, and (d) they increase drilling rate. The oil-in-water water-base emulsions are generally superior to water-in-oil-base emulsions from the standpoint of cost and handling.

Because of the surface active properties of sodium lignosulfonates in strong brines, oil may be added to my base drilling fluid (described in Example 1) and an emulsion formed. The finely divided solids present in my base composition are particularly effective if oil is emulsified therein because they are adsorbed at the oil-brine interface and thereby strengthen the interface in the emulsion system, which in turn causes the emulsion droplets to effectively act as fluid loss barriers.

The following is a specific example of my base drilling fluid to which is added oil, thereby converting it to an emulsion drilling fluid.

| Composition | Lbs. per Bbl. of Brine |
| --- | --- |
| Sodium lignosulfonate | 14 |
| Calcium carbonate | 4 |
| Diesel oil—density 35° A. P. I. | 60 |
| Caustic soda | 2 |

This drilling fluid has the following properties:

| | | |
|---|---|---|
| Viscosity | cps | 7 |
| Initial gel | gms | 0 |
| 10' gel | gms | 0 |
| 30' fluid loss | cc | 1 |
| Density | lbs./gal | 9.3 |
| pH | | 9.35 |

It will be noted that this drilling fluid has low water loss, low density and low viscosity.

In some drilling operations, however, higher viscosities and higher gel values may be desired than those heretofore given. Clay solids may be added to increase the density of the drilling fluid as well as the viscosity and gel values. Of course, the higher viscosity and gel values mean that weighting agents, such as barium sulfate, may be added to still further increase the density of the drilling fluid without danger of settling out.

The following is a typical example of a drilling fluid made in accordance with my invention using a saturated brine solution having 30% by weight sodium chloride. This fluid has low water loss, and relatively low viscosity although an appreciable amount of clay solids have been added to the base emulsion.

| Composition | Lbs. per Bbl. of Brine |
|---|---|
| Clay solids | 117 |
| Sodium lignosulfonate | 17 |
| Sodium hydroxide | 5 |
| Diesel Oil—density 35° A. P. I. | 60 |

This drilling fluid has the following properties:

| | | |
|---|---|---|
| Viscosity | cps | 37 |
| 0 gel | gms | 0 |
| 10' gel | gms | 60 |
| 30' fluid loss | cc | 1.6 |
| Density | lbs./gal | 10.65 |
| pH | | 10.9 |

Drilling fluids prepared in accordance with my invention are stable when used in drilling through salt formations since increase of salt concentration will have no appreciable effect on the initial properties of the drilling fluid. It is possible to prepare drilling fluids in accordance with my invention having low viscosity, low density, and very low water loss. The addition of finely divided colloidal solid materials, as previously explained, will reduce the water loss and relatively small amounts of such solid materials need to be added for this purpose to my drilling fluids as compared with prior drilling fluids. I have found that to obtain fluid loss values of less than 5 cc. only about ⅛ pound to ¼ pound of solids per barrel need be present. The small amount of such solids will therefore not increase the viscosity or density of the original fluid to any substantial amount. My drilling fluids are very effective in drilling through heaving shale formations so that sloughing off of the walls of the borehole resulting in sticking of the drill or closure of the borehole is avoided. My drilling fluid is particularly effective for drilling through tilted formations because my low density fluids having a low water loss will avoid fracturing or softening these formations which frequently cause great difficulties in mountainous regions. On the other hand, my fluid composition also provides high density fluids for use in such regions as the Gulf Coast where it is necessary to use high density fluids to overcome high pressure gas and salt water flows. The use of lignosulfonates in the brine solution yields a fluid having low interfacial tension against oil so that water-blocking difficulties are reduced and completion conditions are improved. My drilling fluids can be readily prepared and can be reused without requiring continual reconditioning. Drilling operation costs are therefore greatly reduced. Such properties thus render my drilling fluids very effective for workover operations. My drilling fluids are also effective for drilling through anhydrite and cement plugs.

Many changes and modifications may be made in the fluid drilling compositions herein described utilizing the examples of my invention which are intended to be included within the scope of the appended claims.

I claim:

1. A drilling fluid comprising a base fluid consisting of a brine solution having at least 20% by weight of sodium chloride and about 1 to about 10% by weight of sodium lignosulfonate dissolved therein, and finely divided insoluble non-swelling calcium salts uniformly distributed therein in amount of about 1% to about 25% by weight of the lignosulfonate, said base fluid having a pH of at least 9.

2. A drilling fluid comprising a base fluid consisting of a brine solution having at least 20% by weight of sodium chloride and about 1 to about 10% by weight of sodium lignosulfonate dissolved therein, finely divided insoluble non-swelling calcium salts uniformly distributed therein in amount of about 1% to about 25% by weight of the lignosulfonate, and mineral oil emulsified therein, said base fluid having a pH of at least 9.

References Cited in the file of this patent

UNITED STATES PATENTS

| | | |
|---|---|---|
| 2,430,039 | Anderson | Nov. 4, 1947 |
| 2,476,845 | Dawson | July 19, 1949 |
| 2,491,436 | Barnes | Dec. 13, 1949 |
| 2,491,437 | Perkins | Dec. 13, 1949 |
| 2,509,588 | Dawson | May 30, 1950 |